(12) United States Patent
Kadous et al.

(10) Patent No.: US 8,164,599 B1
(45) Date of Patent: Apr. 24, 2012

(54) SYSTEMS AND METHODS FOR COLLECTING AND PROVIDING MAP IMAGES

(75) Inventors: Mohammed Waleed Kadous, Sunnyvale, CA (US); Russell Heywood, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/150,478

(22) Filed: Jun. 1, 2011

(51) Int. Cl.
*G09G 5/00* (2006.01)
*G06K 9/00* (2006.01)

(52) U.S. Cl. .................. 345/634; 345/629; 382/113

(58) Field of Classification Search .................. 345/629, 345/634; 382/113
See application file for complete search history.

(56) References Cited

U.S. PATENT DOCUMENTS

| | | | |
|---|---|---|---|
| 7,155,336 | B2 | 12/2006 | Dorfman et al. |
| 7,359,797 | B2 | 4/2008 | Dorfman et al. |
| 7,450,003 | B2 | 11/2008 | Weber et al. |
| 7,557,736 | B1 | 7/2009 | Daily et al. |
| 7,587,276 | B2 | 9/2009 | Gold et al. |
| 7,634,358 | B2 | 12/2009 | Jendbro |
| 7,756,630 | B2 | 7/2010 | Dorfman et al. |
| 7,920,072 | B2 | 4/2011 | Smith et al. |
| 2006/0026170 | A1 | 2/2006 | Kreitler et al. |
| 2006/0241860 | A1 | 10/2006 | Kimchi et al. |
| 2007/0014488 | A1 | 1/2007 | Chen et al. |
| 2007/0027887 | A1* | 2/2007 | Baldwin ................ 707/100 |
| 2007/0200713 | A1 | 8/2007 | Weber et al. |
| 2007/0204218 | A1 | 8/2007 | Weber et al. |
| 2008/0028341 | A1* | 1/2008 | Szeliski et al. ............ 715/854 |
| 2008/0043020 | A1 | 2/2008 | Snow et al. |
| 2008/0147730 | A1 | 6/2008 | Lee et al. |
| 2008/0183597 | A1* | 7/2008 | Veerappan et al. .......... 705/27 |
| 2008/0238941 | A1* | 10/2008 | Kinnan et al. ............ 345/630 |
| 2008/0240616 | A1* | 10/2008 | Haering et al. ........... 382/294 |
| 2009/0040370 | A1 | 2/2009 | Varanasi |
| 2009/0063034 | A1 | 3/2009 | Han |
| 2009/0153492 | A1 | 6/2009 | Popp |
| 2009/0210388 | A1 | 8/2009 | Elson et al. |
| 2009/0303036 | A1 | 12/2009 | Sahuguet |

(Continued)

FOREIGN PATENT DOCUMENTS

EP 2147392 11/2008

(Continued)

OTHER PUBLICATIONS

Elson et al.; MapCruncher: Integrating the World's Geographic Information; Apr. 2007; ACM; vol. 41, Issue 2; pp. 50-59.*

(Continued)

*Primary Examiner* — Xiao M. Wu
*Assistant Examiner* — David T Welch
(74) *Attorney, Agent, or Firm* — Lerner, David, Littenberg, Krumholz & Mentlik, LLP

(57) ABSTRACT

Aspects of the present disclosure relate to collecting images of maps at plurality of client devices, orienting the images with respect to the Earth, and providing the oriented maps to users. The map images may be collected by users who orient the maps by arranging the position of the image over a picture of the Earth. In another example, users may orient the maps by using "pushpins" to indicate the location of two or more points in the map image to two or more locations on the image of the Earth. The images may be processed in order to generate high quality images which may then be downloaded and used by other users.

20 Claims, 19 Drawing Sheets

U.S. PATENT DOCUMENTS

| | | | |
|---|---|---|---|
| 2009/0325607 A1* | 12/2009 | Conway et al. | 455/456.3 |
| 2010/0035637 A1 | 2/2010 | Varanasi et al. | |
| 2010/0063997 A1 | 3/2010 | Sako et al. | |
| 2010/0106408 A1* | 4/2010 | Kindberg | 701/208 |
| 2010/0107116 A1* | 4/2010 | Rieman et al. | 715/784 |
| 2010/0123737 A1 | 5/2010 | Williamson et al. | |
| 2010/0171757 A1* | 7/2010 | Melamed | 345/632 |
| 2010/0188088 A1 | 7/2010 | Nielsen et al. | |
| 2010/0189312 A1 | 7/2010 | Nielsen et al. | |
| 2010/0215250 A1 | 8/2010 | Zhu | |
| 2010/0293173 A1 | 11/2010 | Chapin et al. | |
| 2010/0295971 A1 | 11/2010 | Zhu | |
| 2010/0309226 A1 | 12/2010 | Quack et al. | |
| 2010/0328344 A1 | 12/2010 | Mattila et al. | |
| 2011/0007962 A1 | 1/2011 | Johnson et al. | |
| 2011/0013014 A1 | 1/2011 | Wassingsbo | |
| 2011/0064312 A1 | 3/2011 | Janky et al. | |
| 2011/0084893 A1* | 4/2011 | Lee et al. | 345/6 |

FOREIGN PATENT DOCUMENTS

| | | |
|---|---|---|
| EP | 2185894 | 2/2009 |
| EP | 1987683 | 1/2010 |
| EP | 2194508 | 6/2010 |
| WO | 2006127388 | 11/2006 |
| WO | 2007001314 | 1/2007 |
| WO | 2007100632 | 9/2007 |
| WO | 2007100740 A2 | 9/2007 |
| WO | 2008134901 | 11/2008 |
| WO | 2009020785 | 2/2009 |
| WO | 2010046123 | 4/2010 |
| WO | 2010059426 | 5/2010 |
| WO | 2010149843 | 12/2010 |
| WO | 2011016995 | 2/2011 |

OTHER PUBLICATIONS

Johannes Schoning, Keith Cheverst, Markus Lochtefeld, Antonio Kruger, Michael Rohs, Faisal Taher, Photomap: Using Spontaneously Taken Images of Public Maps for Pedestrian Navigation Tasks On Mobile Devices, ACM's MobileHCI09, Sep. 15-19, 2009, 10 pages.

Bradley Paul Van Tonder, Adaptive User Interfaces for Mobile Map-Based Visualisation, Dec. 2008, 226 pages.

Michael Harville, Ramin Samadani, Dan Tretter, Debargha Mukherjee, Ullas Gargi, Nelson Chang, Mediabeads: An Architecture for Path-Enhanced Media Applications, Jun. 27-30, 2004, 4 pages.

* cited by examiner

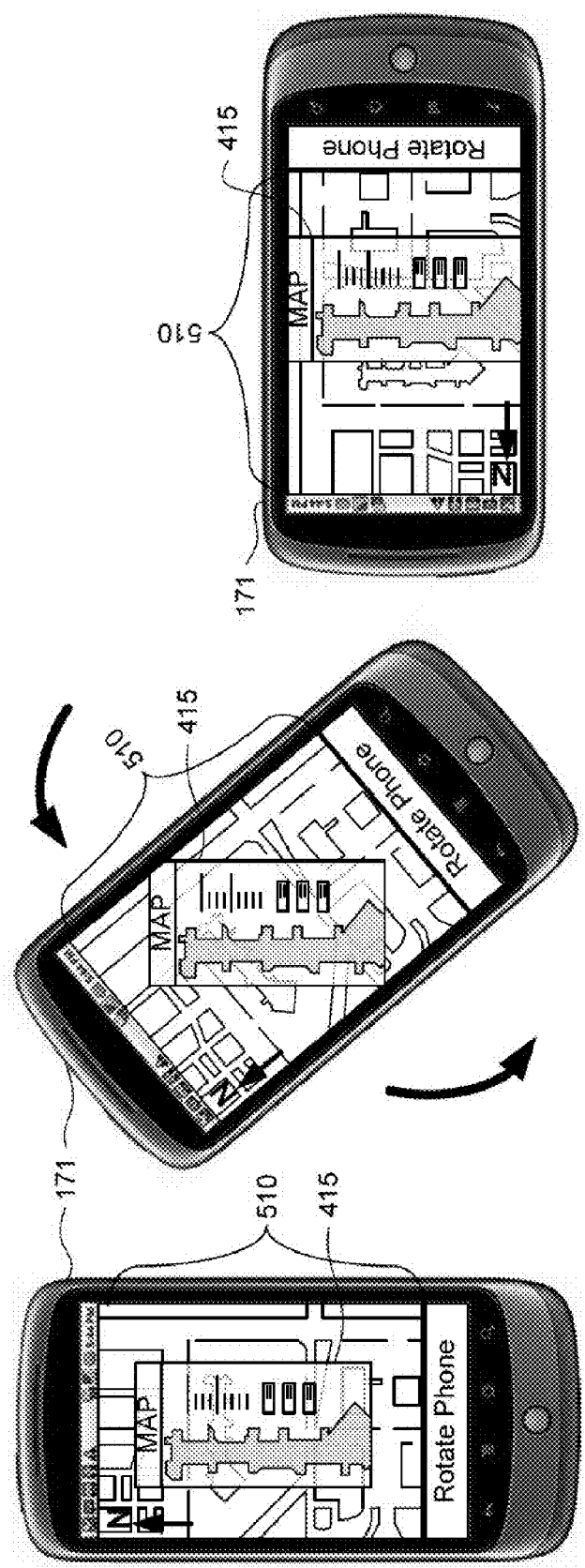

SYSTEMS AND METHODS FOR COLLECTING AND PROVIDING MAP IMAGES

BACKGROUND OF THE INVENTION

Map services provide users with street level and other images of locations. For example, some street map services may provide users with street level images, satellite images, aerial images, and other geographic images. These images may be collected from a number of different sources. For example, images may be collected by the map service itself, uploaded by users, or retrieved from providers of satellite imagery for the purpose of earth visualization. These types of map services often employ a great deal of images and image information in order to provide comprehensive and up to date image coverage.

Map services may also provide users with incentives for providing information. For example, a map service may identify which users have contributed information to the website. Other systems provide tips about things to do in the area based on GPS location and reward users with reputation points or badges for completing various types of activities.

Various other systems utilize incentives to increase user participation in various programs. For example, some services grant users titles or badges for completing certain tasks before other users. Other systems, for example networking websites which maintain user profiles, may indicate a completion percentage of a user's profile. In another example, some videogames award arbitrary points to uses which complete tasks and succeed at the game. These examples motivate users to add information to their profiles and invite others to participate.

SUMMARY

Aspects of the disclosure relate generally providing usable maps of various locations. More specifically, aspects relate to collecting images of maps at plurality of client devices, orienting the images with respect to the Earth, and providing the oriented maps to users. The map images may be collected by users who orient the maps by arranging the position of the image over a picture of the Earth. In another example, users may orient the maps by using "pushpins" to indicate the location of two or more points in the map image to two or more locations on the image of the Earth. The images may be processed in order to generate high quality images which may then be downloaded and used by other users.

One aspect of the disclosure provides a computer-implemented method. The method includes capturing an image of a map using a camera; associating the image with a geographic location; identifying, by a processor, an image of the Earth based on the geographic location; displaying the image of the map and the image of the Earth on a display of a client device such that the image of the map proximate to the image of the Earth on the display; determining, by the processor, an orientation of the displayed image of the map with respect to the displayed image of the Earth based on information input into the client device by a user including the selection of a first set of corresponding locations between the image of the map and the image of the Earth and the selection of a second set of corresponding locations between the image of the map and the image of the Earth without requiring the user to visit multiple locations in the map image; generating, by the processor, an oriented map image based on the orientation; transmitting the oriented map image to a server; and transmitting the first set of corresponding locations and the second set of corresponding locations to the server.

In one example, the method also includes transmitting a request for a map image to the server computer, the request including a geographic location; receiving a second oriented map image from the server; and displaying the second oriented map image on a display of the client device. Displaying the second oriented map image on a display of the client device may include displaying a list of available maps; receiving a user selected available map of the list of available maps; and displaying the user selected available map as the oriented map image. The second oriented map image received from the server may be in vector form and the oriented map image transmitted to the server is not in vector form. In another example, the image of the Earth is a satellite image of the area surrounding the geographic location. In another example, the image of the Earth is a street map of the area surrounding the geographic location.

Another aspect of the disclosure provides a computer-implemented method. The method includes capturing an image of a map using a camera; associating the image with a geographic location; identifying, by a processor, an image of the Earth based on the geographic location; displaying the image of the map and the image of the Earth on a display of a client device; determining, by the processor, an orientation of the displayed image of the map with respect to the displayed image of the Earth based on information input into the client device by a user without requiring the user to visit multiple locations in the map image; generating, by the processor, an oriented map image based on the orientation; generating orientation information based on information received from a geographic positioning component of the client device; refining the orientation of the oriented map image based on both the orientation and the information received from the geographic positioning component; transmitting the refined orientation to the server computer; and transmitting the oriented map image to a server.

In one example, determining the orientation of the displayed image of the map includes overlaying the image of the map on the image of the Earth and the method further includes enabling rotation of the image of the map with respect to the image of the Earth until a desired orientation is reached, and the information received by the client device includes the identity of the desired orientation. The rotation may be configured to be performed by rotating the client device while maintaining the location of either the image of the map or the image of the Earth with respect to the display of the client device based on information received from an orientation apparatus of the client device. The rotation may be configured to be performed by dragging a point on the map image using a touch screen of the client device.

In another example, identifying the image of the Earth based on the geographic location includes transmitting a request to the server for an image of the Earth, the request including the geographic location and receiving the image of the Earth from the server. In another example, identifying the image of the Earth based on the geographic location includes retrieving the image of the Earth from local memory of the client device based on the geographic location.

In another example, the method also includes transmitting a request for a map image to the server computer, the request including a geographic location; receiving a second oriented map image from the server; and displaying the second oriented map image on a display of the client device. Displaying the oriented map image on a display of the client device may include displaying a list of available maps; receiving a user selected available map of the list of available maps; and displaying the user selected available map as the second oriented map image. The second oriented map image received from the server may be in vector form and the oriented map image transmitted to the server is not in vector form.

Yet another aspect of the disclosure provides a computer-implemented method. The method includes capturing an image of a map using a camera; associating the image with a geographic location; identifying, by a processor, an image of the Earth based on the geographic location; displaying the image of the map and the image of the Earth on a display of a client device; determining, by the processor, an orientation of the displayed image of the map with respect to the displayed image of the Earth based on information input into the client device by a user without requiring the user to visit multiple locations in the map image; generating, by the processor, an oriented map image based on the orientation; transmitting the oriented map image to a server; transmitting a request for information to the server identifying a user of the client; and receiving, in response to the request, statistics regarding the number of users which have viewed a processed version of the oriented map image.

In one example, the method also includes receiving annotation information regarding the oriented map image. In another example, the method also includes generating orientation information based on information received from a geographic positioning component of the client device; refining the orientation of the oriented map image based on both the orientation and the information received from the geographic positioning component; and transmitting the refined orientation to the server computer. In another example, the method also includes transmitting a request for a map image to the server computer, the request including a geographic location; receiving a second oriented map image from the server; displaying the second oriented map image on a display of the client device; and the second oriented map image received from the server is in vector form and the oriented map image transmitted to the server is not in vector form. In another example, determining the orientation of the image of the map includes displaying the image of the map proximate to the image of the Earth on the display; the information input into the client device by the user includes the selection of a first set of corresponding locations between the image of the map and the image of the Earth and the selection of a first set of corresponding locations between the image of the map and the image of the Earth; and transmitting the first set of corresponding locations and the second set of corresponding locations to the server.

Still other aspects of the disclosure provide a tangible, non-transitory, computer-readable storage medium on which computer readable instructions of a program are stored. The instructions, when executed by a processor, cause the processor to perform the methods described above.

Further aspects of the disclosure provide a device including a display coupled to a processor. The device may also include memory coupled to the processor. The processor is operable to perform the methods described above.

BRIEF DESCRIPTION OF THE DRAWINGS

FIGS. 19A-19C are an screen shots in accordance with an exemplary embodiment.

DETAILED DESCRIPTION

In one aspect, a first client device may capture an image of a map. The image of the map is associated with a geolocation. The geolocation may be provided automatically by the client device based on a geographic positioning component or entered manually by the user. The user may also select to edit the image, for example, by cropping, etc.

Next, an image, such as a photograph, map, or other representation, of the Earth is identified based on the geolocation. This image of the Earth may be retrieved from storage at the client device, or the client device may transmit a request to a server for the image. Once the image of the Earth has been retrieved, the image of the map is oriented with respect to the image of the Earth. The oriented image of the map and the associated geolocation are then transmitted to the server.

The server then receives the oriented image of the map and the associated geolocation. The server then processes the oriented image of the map to generate a high quality, oriented map image. The high quality, oriented map image is then stored in memory accessible by the server.

Subsequent to the storage, a second client device may transmit a request for a map image. The request includes a second geolocation. The server receives the request and identifies the high quality, oriented map image based on the second geolocation. For example, the geolocation associated with the map image may be at or near the second geographic location. Once identified, the high quality, oriented map image is transmitted to the second client device. The second client device receives and displays the high quality, oriented map image. It will be understood that the first and second client devices may be the same or different client devices.

Figure 1:
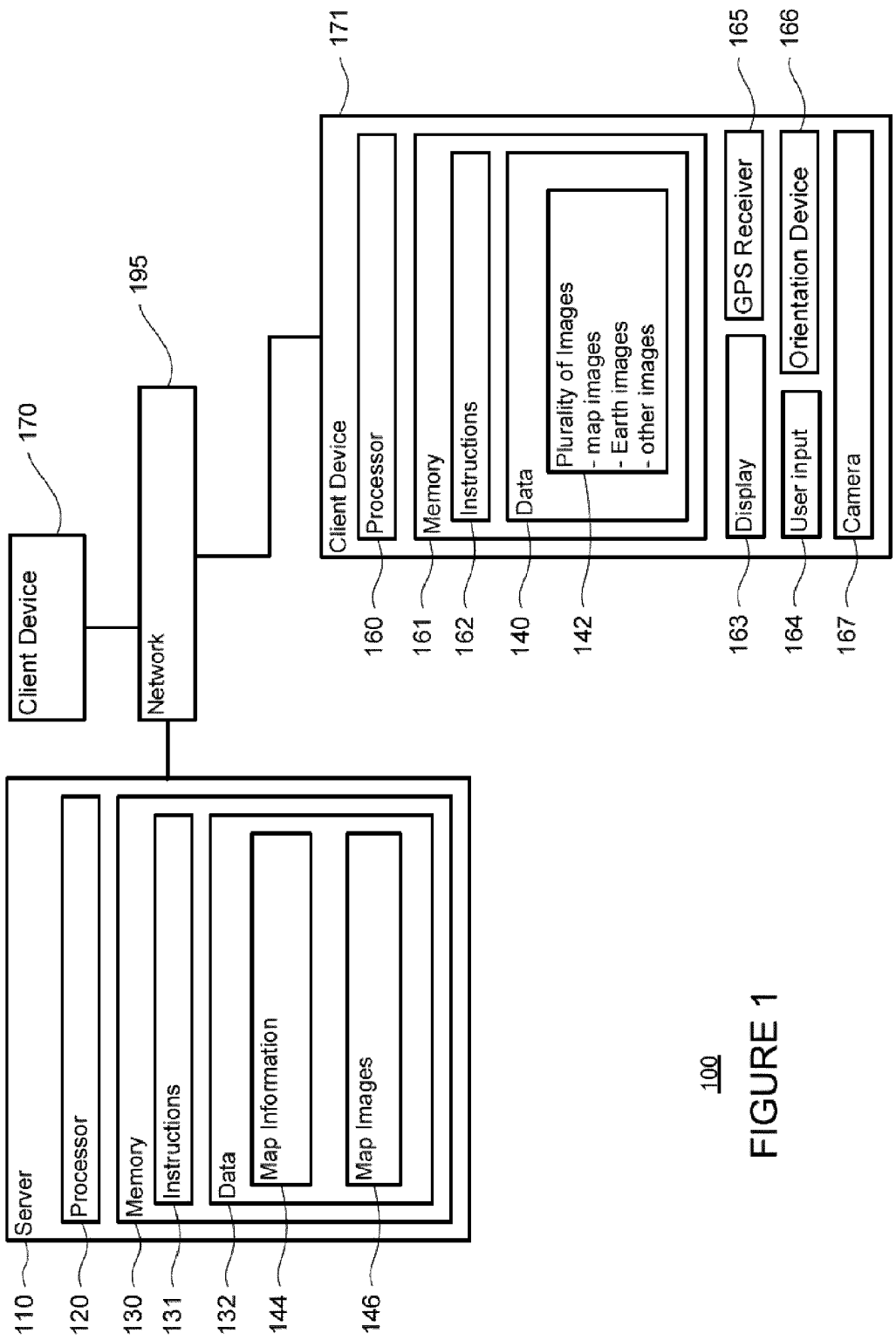
FIG. 1 is an functional diagram of a system in accordance with an exemplary embodiment.
Figure 2:
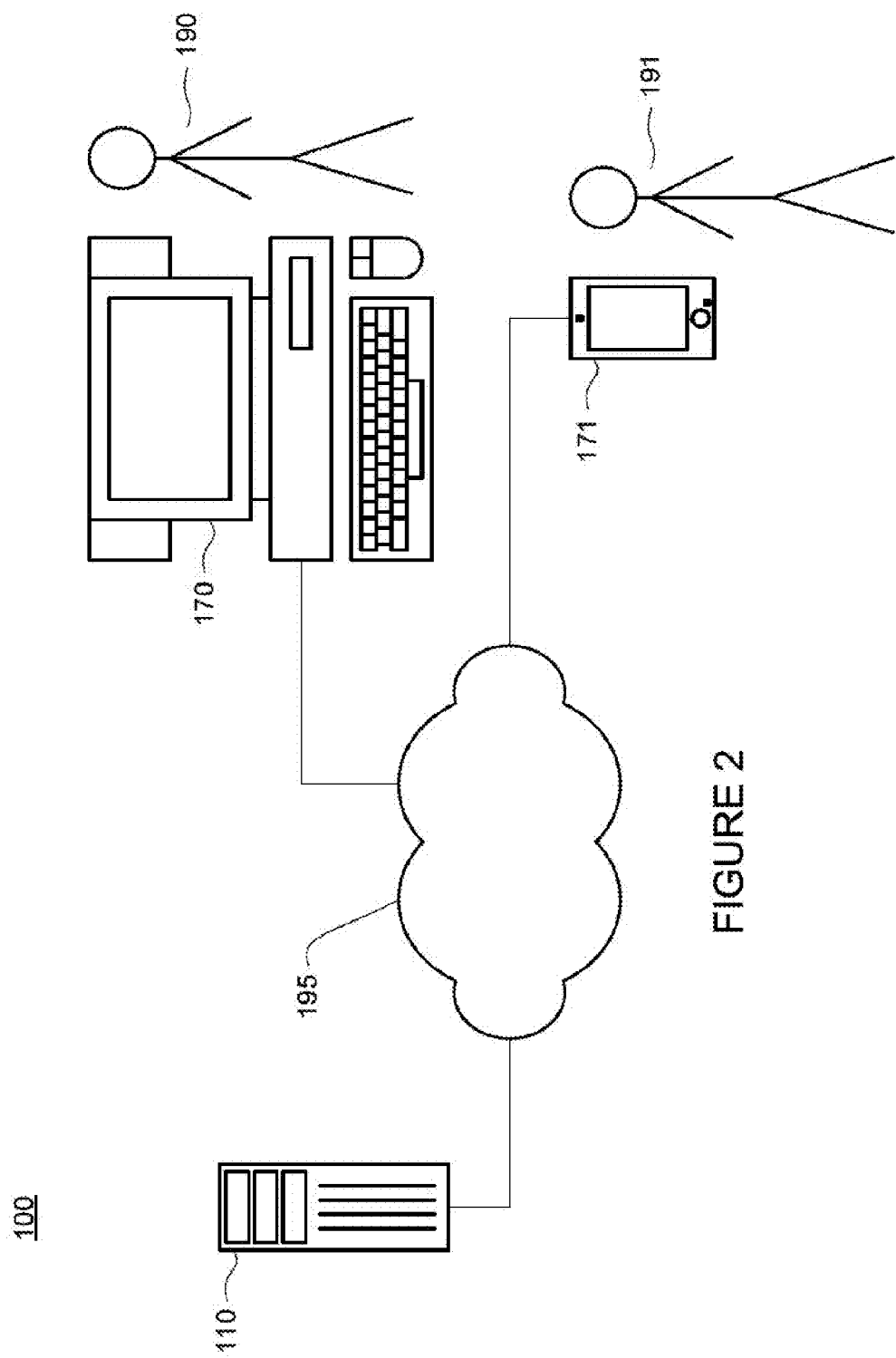
FIG. 2 is an exemplary pictorial diagram of the system of FIG. 1.

As shown in FIGS. 1-2, an exemplary system 100 may include computers 110, 170, and 171. Computer 110 may contain a processor 120, memory 130 and other components typically present in general purpose computers. Memory 130 of computer 110 stores information accessible by processor 120, including instructions 131 that may be executed by the processor 120. Memory also includes data 132 that may be retrieved, manipulated or stored by the processor. The memory may be of any type capable of storing information accessible by the processor, such as a hard-drive, memory card, ROM, RAM, DVD, CD-ROM, write-capable, and read-only memories. The processor 120 may be any well-known processor, such as processors from Intel Corporation or Advanced Micro Devices. Alternatively, the processor may be a dedicated controller such as an ASIC.

The instructions 131 may be any set of instructions to be executed directly (such as machine code) or indirectly (such as scripts) by the processor. In that regard, the terms "instructions," "application," "steps" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 132 may be retrieved, stored or modified by processor 120 in accordance with the instructions 131. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Similarly, the processor may actually comprise a collection of processors which may or may not operate in parallel.

The computer 110 may be at one node of a network 195 and capable of directly and indirectly communicating with other nodes of the network. For example, computer 110 may comprise a web server that is capable of communicating with client devices 170-71 via network 195 such that server 110 uses network 195 to transmit and display information to user 190 on display of client device 170. Server 110 may also comprise a plurality of computers, e.g., a load balanced server farm, that exchange information with different nodes of a network for the purpose of receiving, processing and transmitting data to the client devices. In this instance, the client devices will typically still be at different nodes of the network than any of the computers comprising server 110.

Each client device may be configured similarly to the server 110, with a processor 160, memory 161, instructions 162, and data 140. Each client computer 170-71 may be a personal computer, intended for use by a person 190-91, having all the internal components normally found in a personal computer such as a central processing unit (CPU), display device 163 (for example, a monitor having a screen, a projector, a touch-screen, a small LCD screen, a television, or another device such as an electrical device that is operable to display information processed by the processor), CD-ROM, hard-drive, user input 164 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, PDAs, network computers lacking local storage capability, set-top boxes for televisions, and other networked devices.

Although the computers 170-71 may comprise a full-sized personal computer, the system and method may also be used in connection with mobile devices capable of wirelessly exchanging data with a server over a network such as the Internet. By way of example only, client device 171 may be a wireless-enabled PDA, hand-held or in-car navigation device, tablet PC, netbook, or a cellular phone capable of obtaining information via the Internet. The user may input information, for example, using a small keyboard, a keypad, or a touch screen.

The server 110 and client computers 170-71 are capable of direct and indirect communication, such as over network 195. Although only a few computers are depicted in FIGS. 1-2, it should be appreciated that a typical system can include a large number of connected computers, with each different computer being at a different node of the network 195. The network, and intervening nodes, may comprise various configurations and protocols including the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computers, such as modems (e.g., dial-up, cable or fiber optic) and wireless interfaces.

Although certain advantages are obtained when information is transmitted or received as noted above, other aspects of the system and method are not limited to any particular manner of transmission of information. For example, in some aspects, information may be sent via a medium such as a disk, tape or CD-ROM. Yet further, although some functions are indicated as taking place on a single client device having a single processor, various aspects of the system and method may be implemented by a plurality of computers, for example, communicating information over network 195.

As shown in FIG. 1, the client device may access a plurality of images 142. The images may include images of maps collected by a camera associated with the client device or downloaded by a user. The maps in the images may be any type of map, including, for example, trail maps, national parks, airport terminals, rail maps, office parks, as well as indoor maps of malls, stadiums, museums and other such places. The images may also include images of the Earth, for example, street maps or satellite images.

The client device may also include geographic position component 165, to determine the geographic location. For example, client device 170 may include a GPS receiver to determine the device's latitude, longitude and altitude position. Thus, as the client device changes location, for example by being physically moved, the GPS receiver may determine a new current location. The component 165 may also comprise software for determining the position of the device based on other signals received at the client device 170, such as signals received at a cell phone's antennas from one or more cell phone towers if the client device is a cell phone.

Client device 171 may also include an orientation device 166, such as an accelerometer, gyroscope, compass, and/or software to determine the direction in which the device is oriented. For example, an accelerometer may be used to detect the effect of gravity on the client device measured, for example, in meters per second per second. By way of example only, the client device may use input from the accelerometer to determine the client device's pitch, yaw or roll (or changes thereto) relative to the direction of gravity or a plane perpendicular thereto. In that regard, it will be understood that a client device's provision of orientation data as set forth herein may be provided automatically to the client device.

Client device 171 may also include a camera 167 for collecting images. The camera may be incorporated into the client device or may be a peripheral device which is connected wirelessly via a network or cable to load images onto the client device. In this regard, it will be understood that images 142 may be stored locally at the client device, camera 167 or both.

Server 110 may have access to map data 144. The map data may include map-related information, at least a portion of which may be transmitted to a client device. For example, map data may store map tiles, where each tile is a map image of a particular geographic area. Depending on the resolution (e.g., whether the map is zoomed in or out), one tile may cover an entire region, such as a state, in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images). The various map tiles are each associated with geographical locations, such that the server 110 is capable of selecting, retrieving and transmitting one or more tiles in response to receipt of a geographical location.

Server 110 may also access images 146. It will be understood that images 146 may be stored as a part of map data 144 or separately. Images 146 may include images of maps collected by a plurality of different users and transmitted to the server. These maps may be "available maps" or maps which have been made available for download from the server by the users. Similar to the plurality of images 142 of client device 171, the images may include images of maps such as trail maps, national parks, airport terminals, rail maps, office parks, as well as indoor maps of malls, stadiums, museums and other such places. Images 146 may also include images of the Earth, for example, street maps or satellite images which may be transmitted by the server to the client devices.

As noted below, the locations may be expressed in various ways including but not limited to latitude/longitude positions, street addresses, points on a map (such as when a user clicks on a map), building names, other data capable of identifying one or more geographic locations, and ranges of the foregoing.

In addition to the operations described below and illustrated in the figures, various operations will now be described. It should also be understood that the following operations do not have to be performed in the precise order described below. Rather, various steps may be handled in a different order or simultaneously. Steps may also be omitted unless otherwise stated.

In one aspect, a user may download an application to a client device. For example, a user may select to download the application. The client device may then transmit a request for the application over the network and in response, receive the application. The application may be installed locally at the client device.

Figure 3:
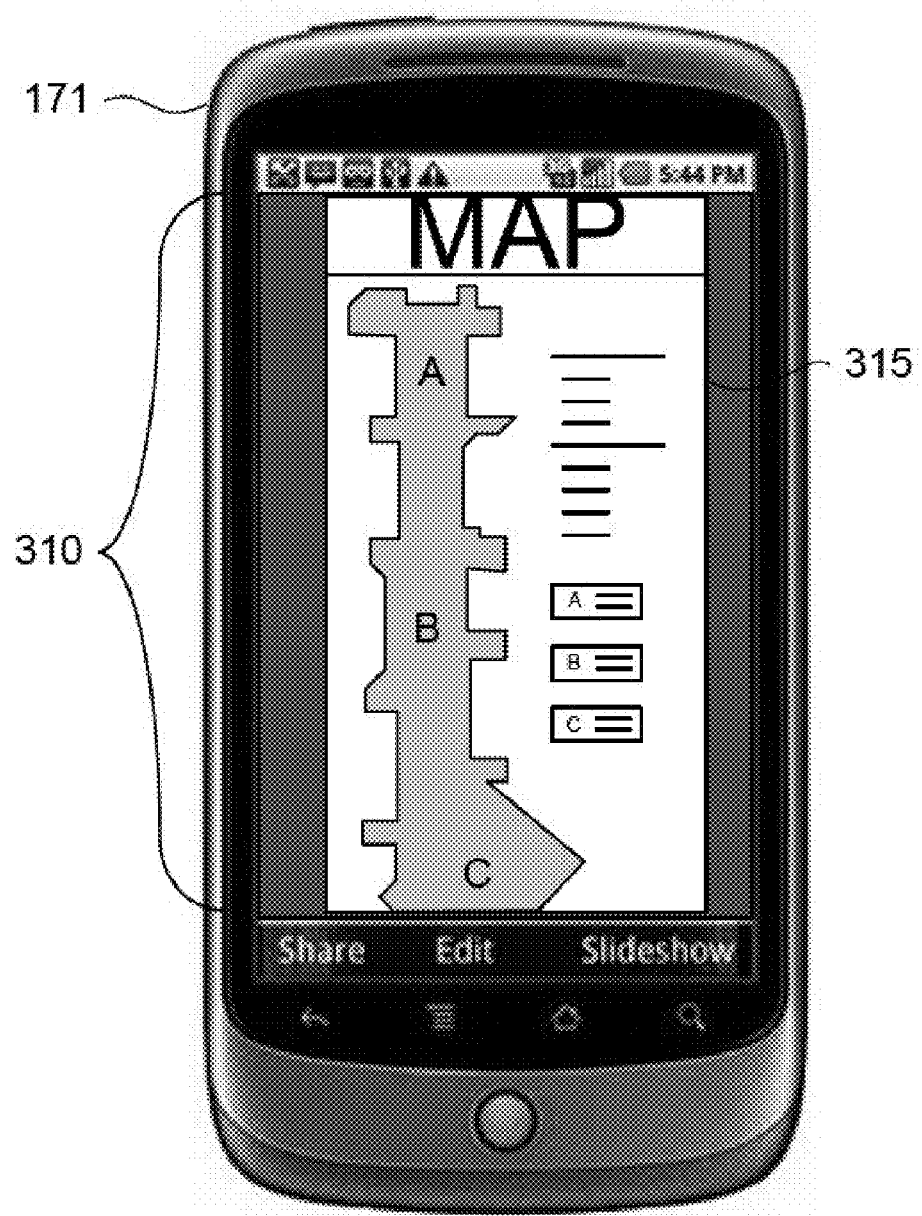
FIG. 3 is an screen shot in accordance with an exemplary embodiment.

Once the application is installed, a user may capture an image of a map using a camera. In one example, the user may activate the application and capture an image using a camera. The camera may be incorporated into a client device, for instance, as shown in FIG. 3, client device 171 may capture image 310 of map 315.

Figure 4:
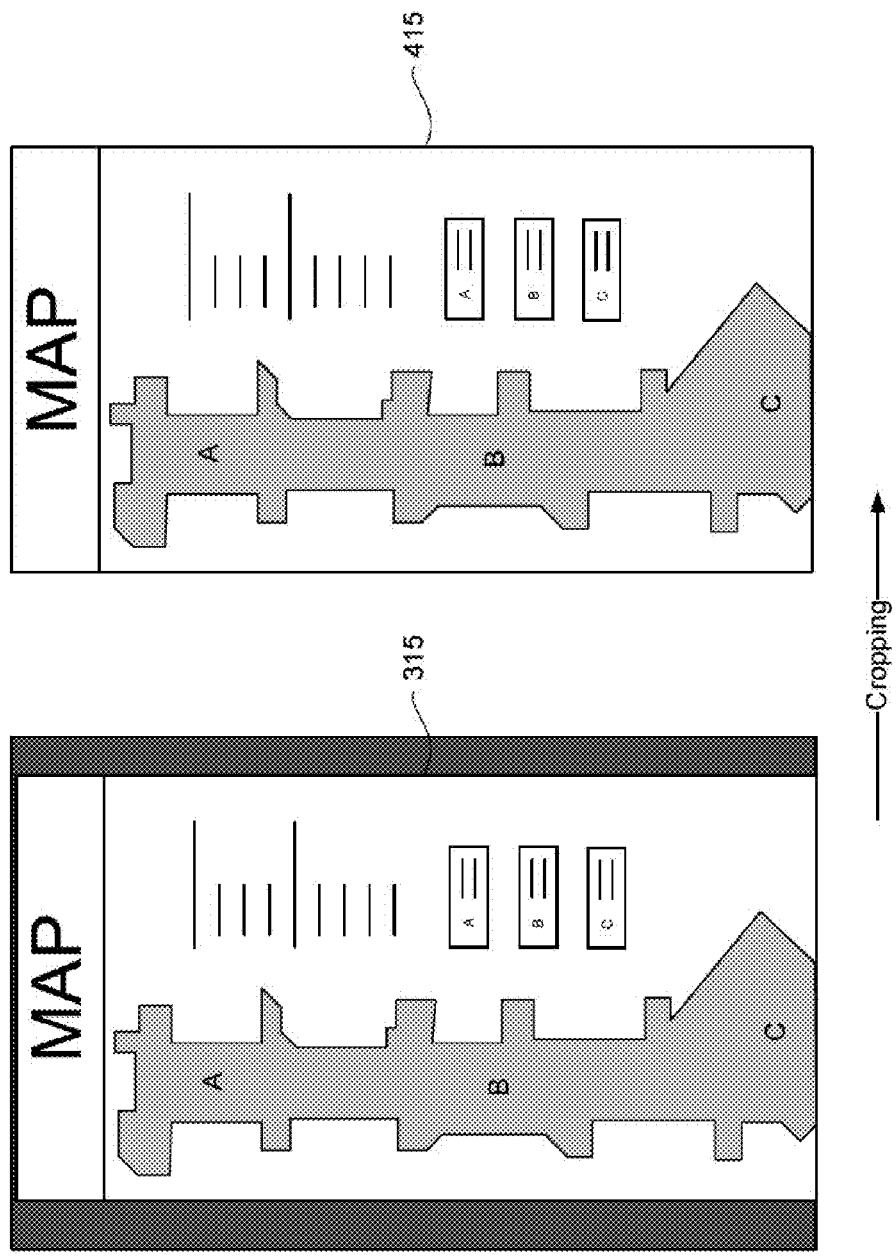
FIGS. 4A and 4B are images of maps in accordance with an exemplary embodiment.

Once the camera has captured the image, it may be stored locally at the client device or transmitted to another client device for processing by the user. The user may wish to crop, rotate, or skew the image or adjust the brightness, sharpness, contrast, or monochrome (for readability improvement or aesthetic improvement) of the image, for example, to improve the quality or usefulness of the image. For example, map image 315 is shown as cropped by a user in map image 415 of FIGS. 4A and 4B. Other types of image processing such as perspective correction, curvature removal, automatic cropping and various edge detection techniques may also be performed by the user or the application.

The image may be associated with geolocation information. For example, the application may request that the user provide location information. In response, the user may enter a location, such as an address or geolocation coordinates. In another example, the geolocation information may be determined automatically by the client device.

Based on the geolocation information associated with the image of the map, the client device may retrieve a collocated image of the Earth. As described above, the Earth image may include a map (such as a street map), a photograph (such as a satellite image), or other representation (such as a rendered image) of the area associated with the image of the map. For example, the client device may have access to a plurality of satellite images of different areas of the Earth. In another example, the client device may transmit a request including a geographic location to a server computer and download a collocated image of the Earth from the server.

Figure 5:
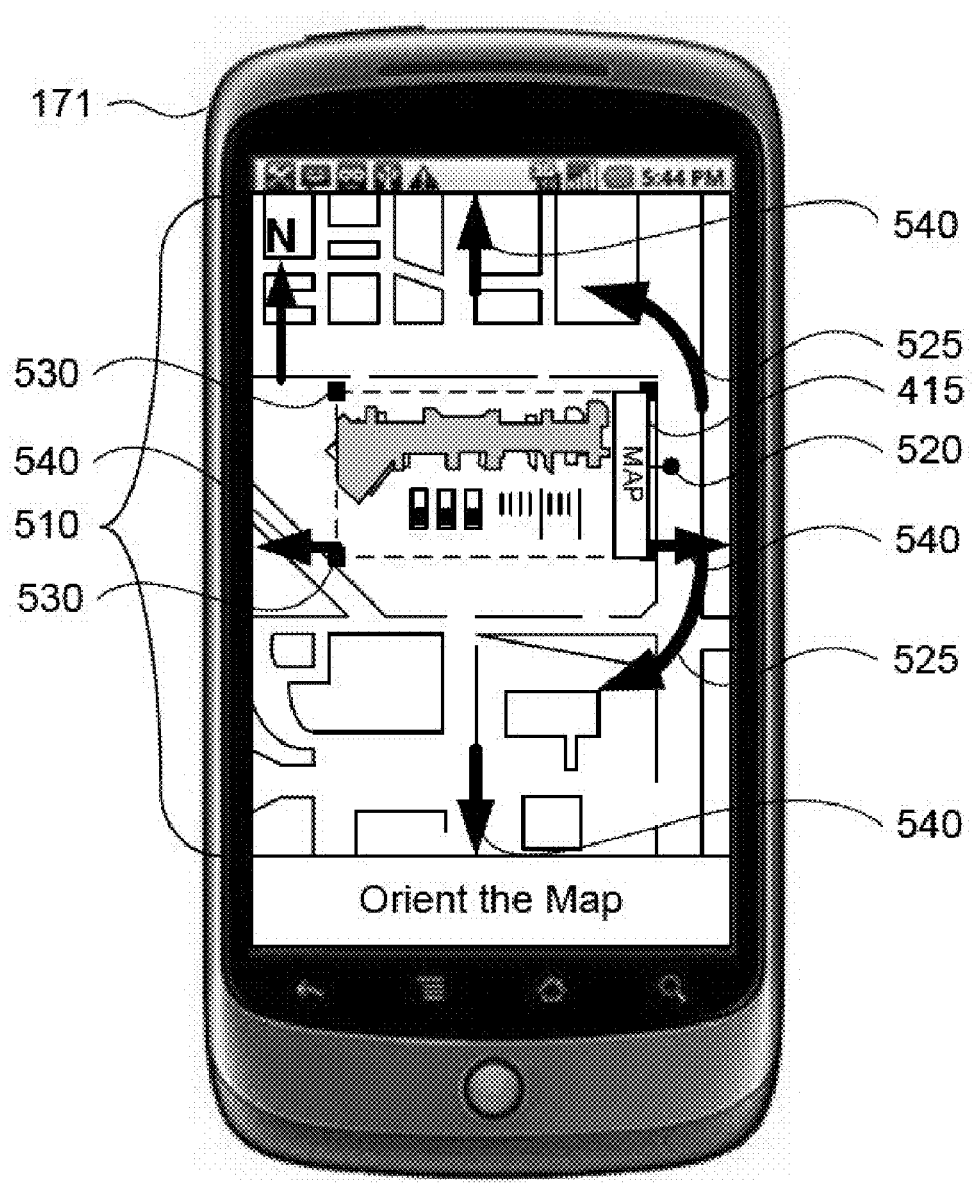
FIG. 5 is another screen shot in accordance with an exemplary embodiment.

The collocated image of the Earth may be displayed to the user in order to allow the user to orient the image of the map with respect to the image of the Earth. As shown in FIG. 5, cropped map image 415 may be displayed over Earth image 510. If the client device includes a touch screen, the user may rotate map image 415, e.g., by sliding the user's finger from point 520 along one of the directions shown by rotation arrows 525. The user may also drag the image 415 to another location on map 510. For example, the user may pan the Earth image 510 by using arrows 540. The user may also use corners 530 to stretch map image 520 in order to fit the map to the Earth image 520. In another example, the user may use a mouse device to click and manipulate the image.

In another example, the user may rotate the client device while the satellite image or the image of the map remains "stationary" in order to align the images. For example, the client device may include an accelerometer, gyroscope, or other orientation device to measure the change in orientation in the client device in order to change the position of only one of the images with respect to the display of the client device. As shown in FIGS. 19A-19C, a user may rotate client device 171 counterclockwise (or clockwise) while Earth image 510 remains stationary with respect to the display of the client device. In other words, Earth image displayed on the client device does not change its orientation while the client device is rotated, and the map image may be rotated as shown in the figures. As the client device is rotated from FIG. 19A to FIG. 19B to FIG. 19C, the map image 415 may move into alignment with the Earth image 510. Alternatively, the map image may remain stationary with respect to the display of the device while the Earth image is moved into alignment with the map image. In some examples, the image of the map may be made translucent as shown by map 415 in FIGS. 19A-19C in order to allow the user to better orient the two images. The orientation, or direction of the image of the map, may then be associated with the image to generate an oriented map image.

Figure 6:
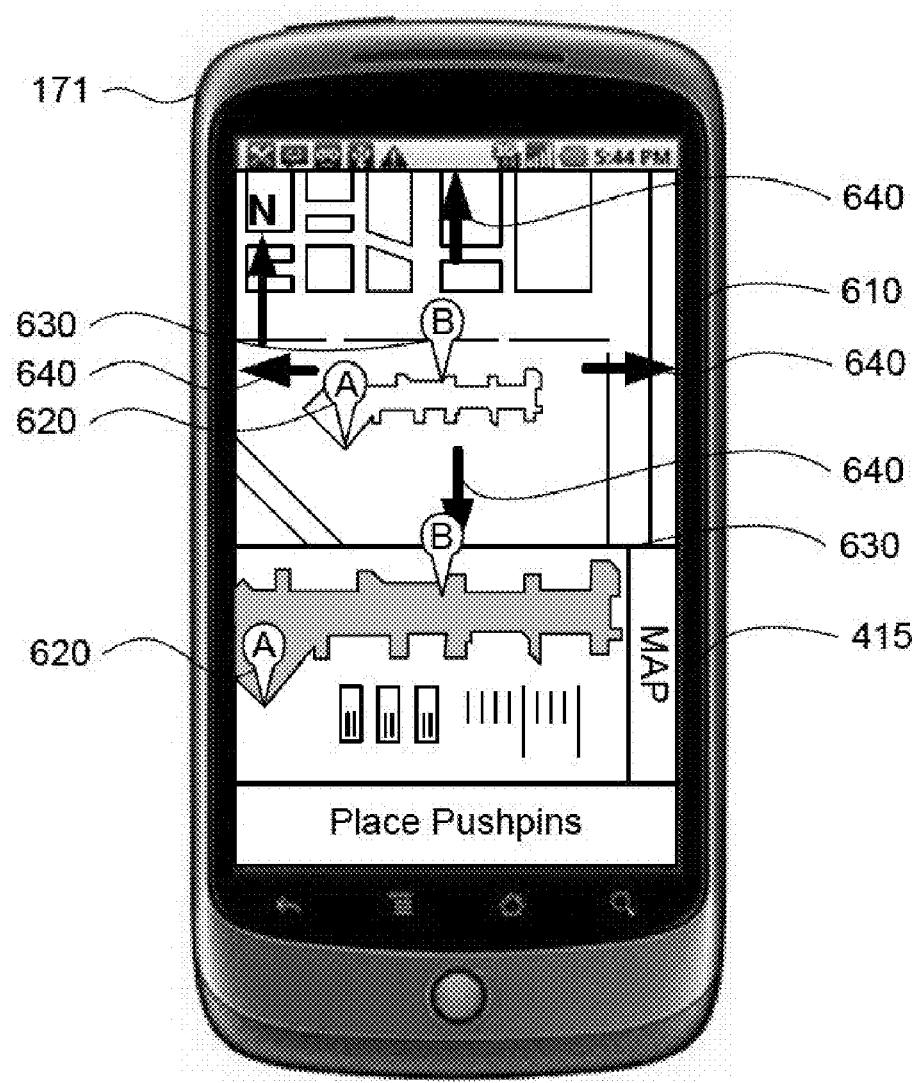
FIG. 6 is a further screen shot in accordance with an exemplary embodiment.

Alternatively, the image of the Earth may be displayed proximate to, as opposed to beneath, the image of the map. For example, as shown in FIG. 6, Earth image 610 may be displayed next to cropped map image 415. Again, the user may use arrows 640 to pan the Earth image 610 to another location. In this example, the user may place "pushpin" pairs 620 ("A") or 630 ("B") or other such icons on both images in order to orient the images with respect to one another. The oriented image of the map may then be displayed to the user. Once the user identifies the sets of corresponding locations between the image of the map and the image of the earth. The corresponding locations may be associated with the image of the map as an oriented map image. In another example, the corresponding locations may be used to determine an orientation value, for example, North or 0-360 degrees, and associated with the image of the map.

It will be understood that any of the above alignment and orientation examples described above may be used alone or in combination. For example, if after rotating the client device as shown in FIG. 19C, the map image is still not completely aligned with the Earth image, the user may use a touch screen or mouse to drag the map image to a new position in order to align the images.

The examples provided above allow the user to generate an oriented map image without having to visit different locations in the map image. For example, the user does not need to walk to points of interest in the map image and collect geographic positioning data such as GPS coordinates in order to allow the client device to determine the orientation of the image. Rather, the user may provide his or her own estimated orientation information quickly and easily.

In another alternative, once a user has aligned the two images, the application may use further image processing techniques to refine this alignment. For example, using GPS coordinates to identify collocated images, the "rough" oriented map image may be examined to find a correspondence between the map image and the Earth imagery and/or other data, such as existing buildings or structures, in order to automatically "snap" the map image to the satellite imagery. Using this process as a "refinement" of the rough user provided orientation rather than an initial orientation determination may save a fair amount of processing power and time at the client device (and possibly later at the server).

Figure 7:
FIG. 7 is yet another screen shot in accordance with an exemplary embodiment.

Once the user is satisfied with the orientation, he or she may select to transmit the oriented image over a network. For example, as shown in FIG. 7, the user may be provided with a list 710 of various options for sharing the cropped and oriented map image. In some examples, rotation or map pins may not be necessary as the image of the map may initially be aligned with the Earth image. If the user selects the "Mob-Map" destination 720, the cropped and oriented map image may be transmitted to server 110.

The uploaded image may be received by a server computer for further processing. Any of the processing methods described above may also be performed by the server or human operators. In addition, the server may divide the map into various sections, such as stores and departments, annotate the map with text labels, and identify typical pedestrian paths through the indoor space. The server may also receive the image from the client device in one form and transform the image into another form, such as from a non-vector form to a vector form ("vectorize"). The server may also trace the map and/or interpret the map in order to generate a high quality searchable maps of the geolocation of the image of the map.

Figure 8:
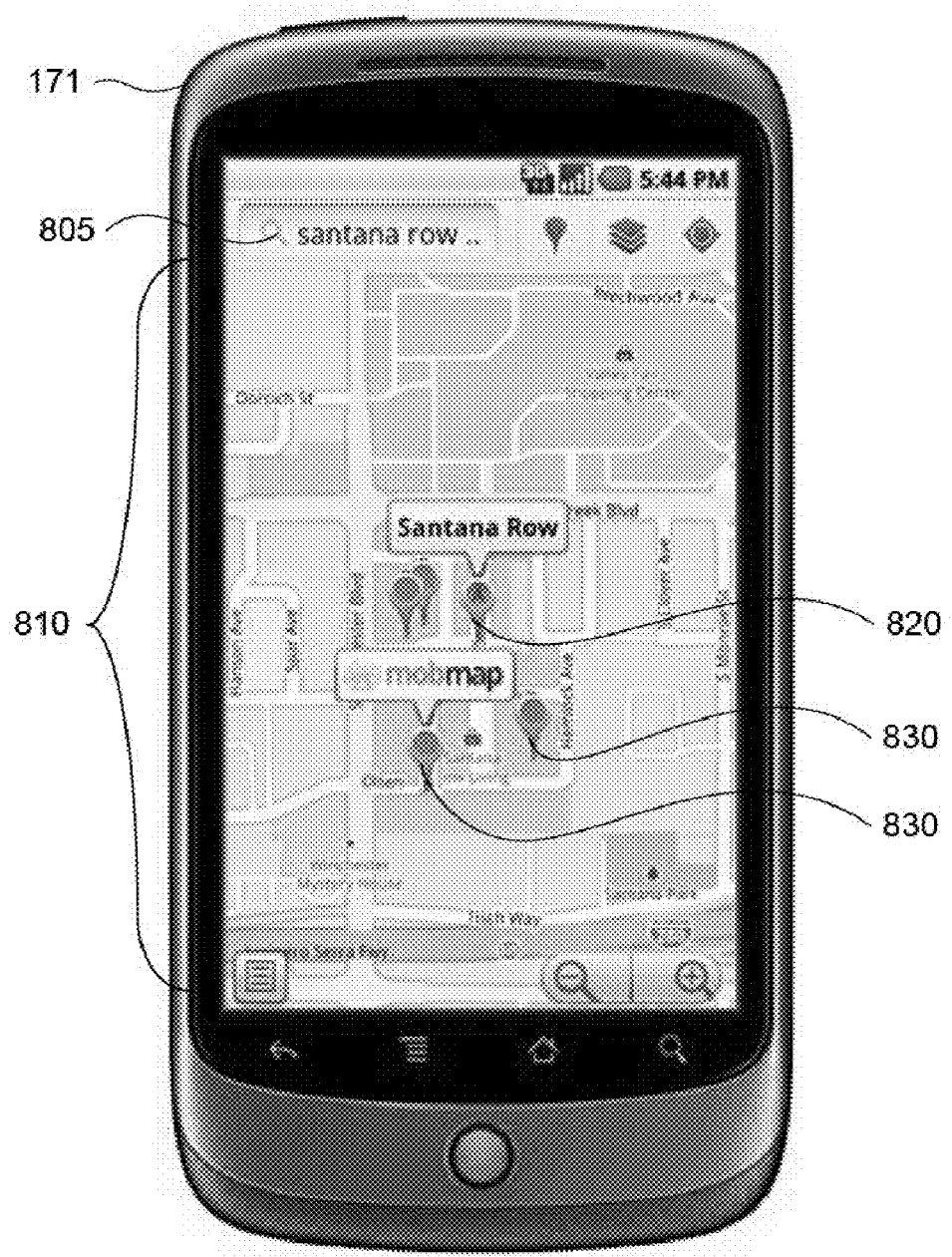
FIG. 8 is another screen shot in accordance with an exemplary embodiment.

The high quality maps may then be provided to users upon request. For example, a user may request a street map of a particular area. Once the map is displayed, the map may include a plurality of indicators which, if selected, will display a map. For example, as shown in FIG. 8, a user may enter a search for "santana row" into search box 805. In response, the client device may request a street map image from server 110. Once received from the server, client device may display street map 810 with a plurality of pins 820 and 830. Pin 820 may indicate a general or specific location corresponding to the search terms "santana row." Pins 830 may indicate locations for which the user may request more particular maps.

Figure 9:
FIG. 9 is still a further screen shot in accordance with an exemplary embodiment.
Figure 10:
FIG. 10 is yet another screen shot in accordance with an exemplary embodiment.

Upon selecting a pin 830, the client device may display a list of available map images 910 at the location of pin 830 as shown in FIG. 9. The user may then select an available map image. Once selected, the available map image may be retrieved from local storage at the client device or requested from a server over a network. The available map may then be displayed to the user. As shown in FIG. 10, the available map image 1010 may also include a navigation icon 1020 to indicate the direction in which client device 171 is oriented generally or oriented with respect to the map. This orientation may be determined based on positioning data such as GPS, radio signal strength and time of arrival or other orientation device information as described above.

In another example, a second user may request an available map image of a particular location, rather than a street map identifying locations which are associated with available map images. In response, the user may download an image of an available map to the user's client device. The available map may then be displayed to the user as shown in FIG. 10.

Figure 11:
FIG. 11 is another screen shot in accordance with an exemplary embodiment.

The available map images may be displayed in any number of different ways. For example, rather than displaying the available map as a full screen, the available map image may be overlaid on the street map. As shown in FIG. 11, available map 1120 is displayed in its relative location and orientation over street map 1110.

Figure 12:
FIG. 12 is still another screen shot in accordance with an exemplary embodiment.

In an alternative shown in FIG. 12, a user may enter a search for "santana row" into search box 1205. In response, the client device may request a street map image from server 110. Once received from the server, client device may display street map 1210 with one or more pins 1230 may indicate a general or specific location corresponding to the search terms "santana row."

Figure 13:
FIG. 13 is a screen shot in accordance with an exemplary embodiment.

If the user selects pin 1230, the client device may display a "place page" 1310 as shown in FIG. 13. A place page may contain various types of information, such as contact information, hours, user reviews, etc. related to the location, here "Santana Row." The place page may also contain a link or button 1320 which, if selected will provide the users with map images of the location.

Figure 14:
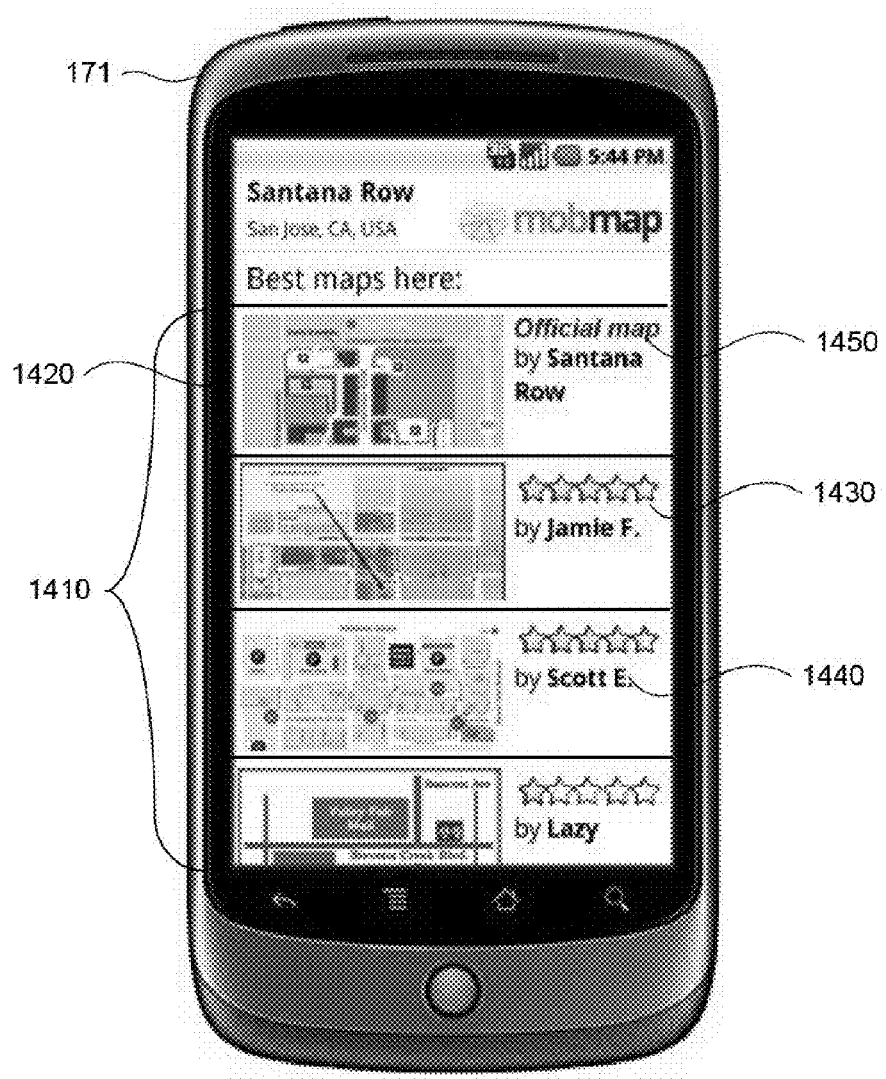
FIG. 14 is another screen shot in accordance with an exemplary embodiment.

In some examples, when pins 820 of FIG. 8, pin 1220 of FIG. 12, or button 1320 of FIG. 13 are selected, the client device may display a list of available map images as shown in FIG. 9 or 14. Turning to FIG. 14, in addition to the list of available map images 1410, the client device may also display small images of the maps 1420, ratings 1430 indicating user reviews or usefulness of the map images, as well as user information 1440 identifying the user who contributed the map image. These lists may be ordered based on image quality, floor number, relevance to the user's original inquiry, or user feedback as described below.

Figure 15:
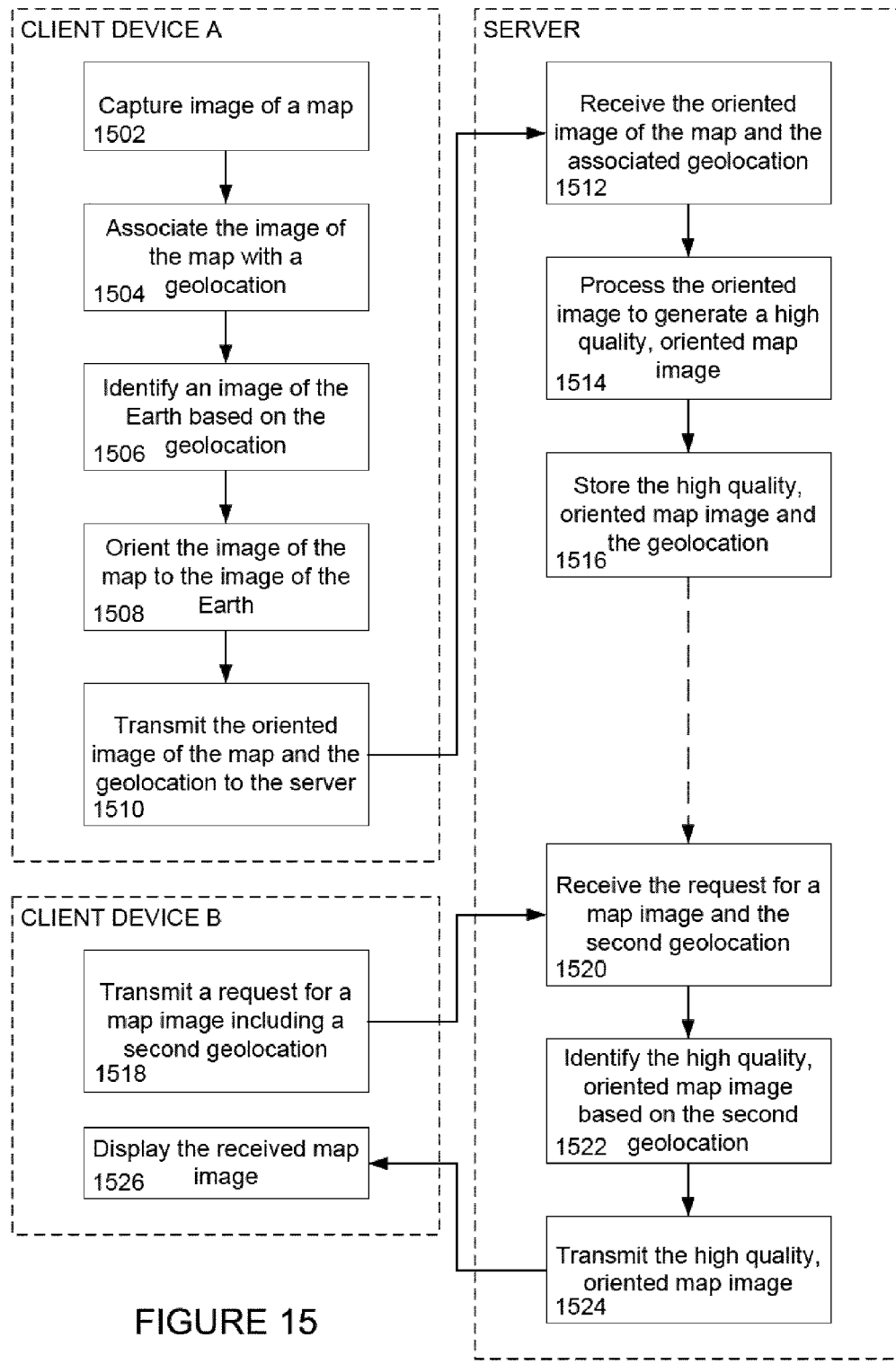
FIG. 15 is a flow diagram in accordance with an exemplary embodiment.

As shown in FIG. 15, a client device A may capture an image of a map at block 1502. The image of the map is associated with a geolocation at block 1504. The geolocation may be provided automatically by the client device based on a geographic positioning component or entered manually by the user. As discussed above, the user may also select to edit the image, for example, by cropping, etc.

Next, an image of the Earth is identified based on the geolocation at block 1506. This image of the Earth may be retrieved from storage at the client device, or the client device may transmit a request to a server for the image. Once the image of the Earth has been retrieved, the image of the map is oriented with respect to the image of the Earth at block 1508. The oriented image of the map and the associated geolocation are then transmitted to the server at block 1510.

The server then receives the oriented image of the map and the associated geolocation at block 1512. The server then processes the oriented image of the map to generate a high quality, oriented map image at block 1514. The high quality, oriented map image is then stored in memory accessible by the server at block 1516.

Subsequent to the storage at block 1516, a second client device B, may transmit a request for a map image at block 1518. The request includes a second geolocation. The server receives the request at block 1520 and identifies the high quality, oriented map image based on the second geolocation at block 1522. For example, the geolocation associated with the map image may be at or near the second geographic location. Once identified, the high quality, oriented map image is transmitted to client device B at block 1524. Client device B receives and displays the high quality, oriented map image at block 1526. It will be understood that client devices A and B may be the same or different client devices.

Figure 16:
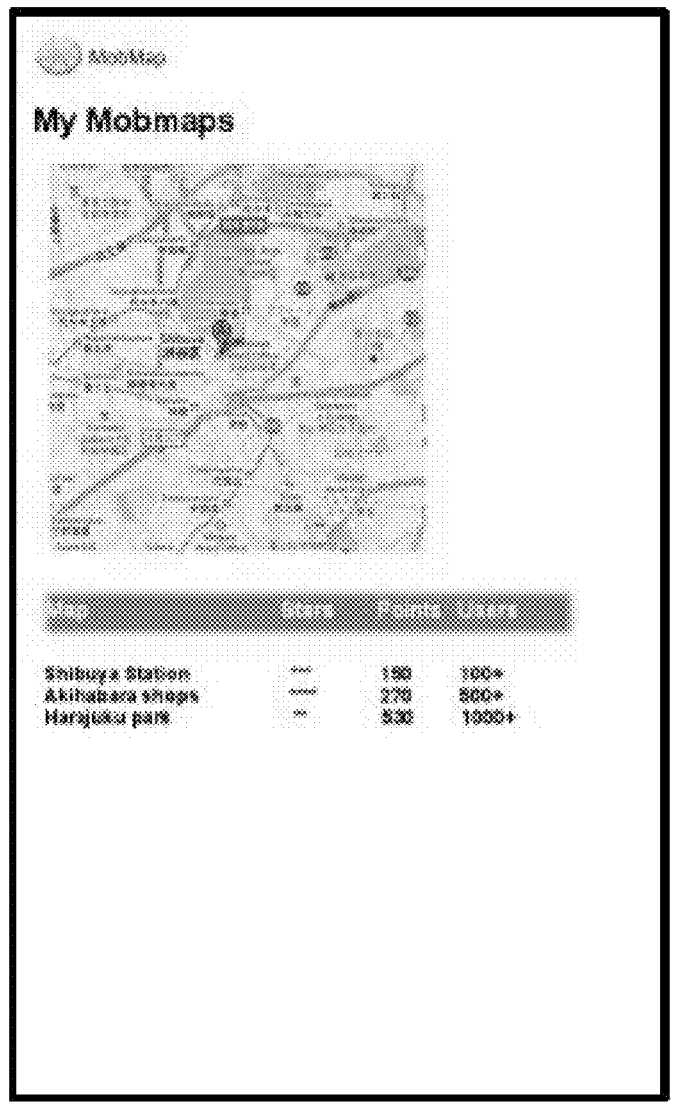
FIG. 16 is a screen shot in accordance with an exemplary embodiment.

Once a user has contributed map images, the user may be able to log into an account to view his or her contributions. For example, a user may access the application in order to log into an account, for example, by providing a user name and password, and view statistics for his or her contributions as shown in FIG. 16. The user may be able to review all of their contributed map images, the number of other users which have viewed the user's map images, as well as any feedback (shown as starts) provided by other users.

The application may also award incentives to encourage user participation. For example, for each contributed map image, the user may be awarded a number of points or badges, which the user may view when logged into his or her account. In this regard, the user may be awarded more or less points based on the "value" of the contribution. For example, more points may be awarded in a location which has had no contributions or which has only low quality contributions.

Figure 17:
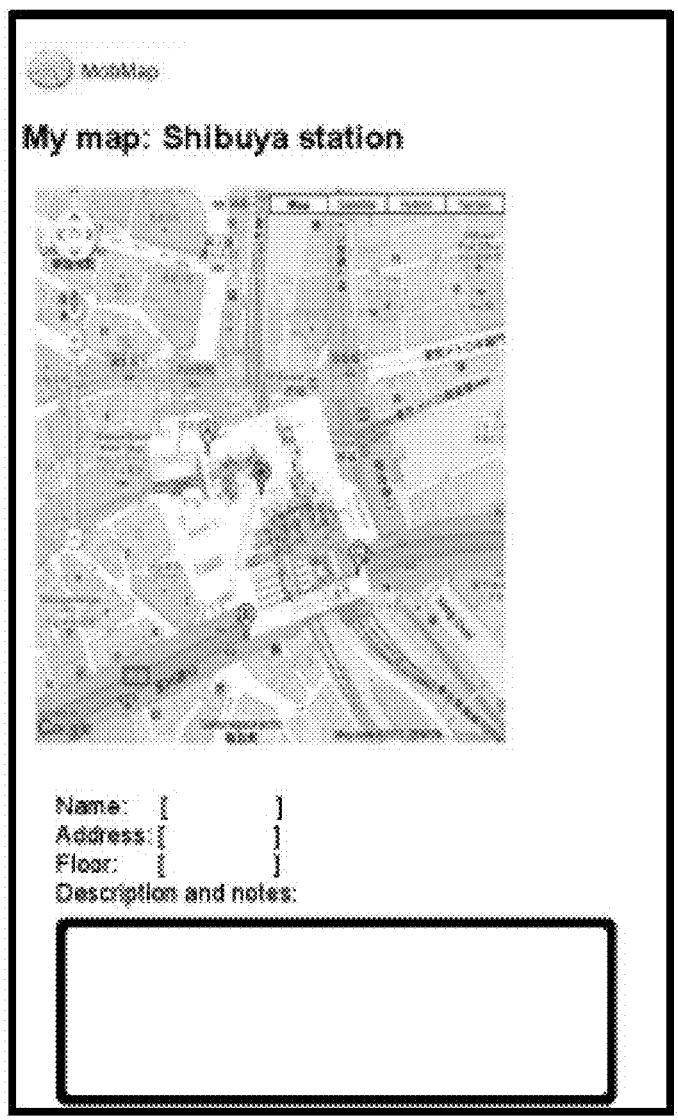
FIG. 17 is another screen shot in accordance with an exemplary embodiment.

The application may also allow the user to annotate his or her contributions and to leave feedback for other users' contributions. For example, as shown in FIG. 17, a user may be prompted to enter information such as the name of the location of the map image, an address, a floor level, or other descriptive information such as the building type (mall, airport, store, hospital, convention center, etc.). This information may then be displayed to other users who request or view the contributed image.

The application may also provide a user with a personalized map. For example, a given user's personalized map may display images of all of the map images contributed by the given user. Thus, turning to FIG. 11, map 1120 may be displayed over the user's personalized map (here, in this example, map 1110).

A user may also use an account as a social tool. For example, a user may "checkin" at a location by indicating his or her position on a map image. The user may then allow a predetermined group of other users, such as friends and family, to view the user's position. This may be an "opt-in" service provided only to users who specifically select to share this information with others.

Various signals may be used in order to rank the high quality, oriented maps in order to identify the best map images of a location. For example, if a particular location is associated with two or more high quality, oriented map images of the same building, the server may rank the two or more map images based on user feedback or quality. Image quality signals may include the pixel resolution of an image, OCR ability, blurriness, contrast score, etc.

The client device may also display an "official" map of a location. In one example, the highest ranking map image may be designated as an official map image. In another example, the official map image may be the map selected by an administrator or provided by a proprietor of a location as a representative map for the location. When the user of a client device requests a map image for a particular address, the server may then transmit the official map image to the client device for display to the user. For example, returning to FIG. 8, upon selecting a pin 830, rather than displaying a list of available maps, the client device may simply display the "official" map of the location (e.g. move directly from FIG. 8 to FIG. 10 or to FIG. 11). In another example, returning to FIG. 14, the client device may highlight one or more map images offered to users for download as "official," as indicated by the official map designation 1450. The official map may be shown above or more prominently then the other available map images. If enough users rate an official map image downwards (badly), it may be "punished" and the next highest map image may be designated as the new official map image.

Figure 18:
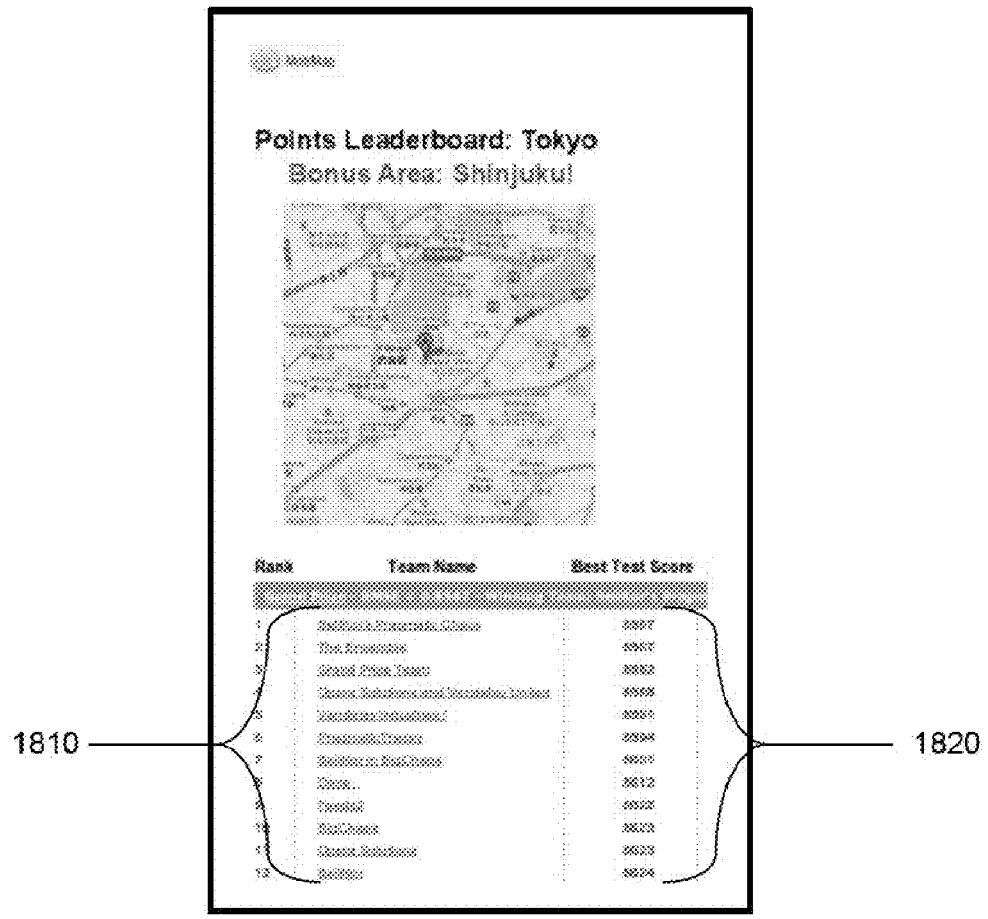
FIG. 18 is a further screen shot in accordance with an exemplary embodiment.

Various other devices and incentives may be used to encourage user participation. For example, as shown in the exemplary screen shot of FIG. 18, the application may be used to run contests among groups 1810 of one or more individuals. Groups or individuals may be awarded points 1820 or badges based on the quantity and/or quality of the user's contributions as described above. In another example, based on a user's location, the application may provide an alert indicating that a map image is needed for a location nearby.

As these and other variations and combinations of the features discussed above can be utilized without departing from the subject matter defined by the claims, the foregoing description of the embodiments should be taken by way of illustration rather than by way of limitation of the subject matter defined by the claims. It will also be understood that the provision of the examples described herein (as well as clauses phrased as "such as," "including" and the like) should not be interpreted as limiting the invention to the specific examples; rather, the examples are intended to illustrate only one of many possible embodiments. Further, the same reference numbers in different drawings may identify the same or similar elements.

The invention claimed is:

1. A computer-implemented method comprising:
capturing an image of a map using a camera;
associating the image with a geographic location;

identifying, by a processor, an image of the Earth based on the geographic location;

displaying the image of the map and the image of the Earth on a display of a client device such that the image of the map is proximate to the image of the Earth on the display;

determining, by the processor, an orientation of the displayed image of the map with respect to the displayed image of the Earth based on information input into the client device by a user including the selection of a first set of corresponding locations between the image of the map and the image of the Earth and the selection of a second set of corresponding locations between the image of the map and the image of the Earth without requiring the user to visit multiple locations in the map image;

generating, by the processor, an oriented map image based on the orientation;

receiving information from a geographic positioning component of the client device;

subsequent to determining the orientation and receiving the information from the geographic positioning component, refining the orientation of the oriented map image by using a set of images identified based on both the orientation and the information received from the geographic positioning component, without requiring the user to visit multiple locations in the map image;

transmitting the oriented map image to a server; and transmitting the first set of corresponding locations and the second set of corresponding locations to the server.

2. The method of claim 1, further comprising:

transmitting a request for a map image to the server computer, the request including a geographic location;

receiving a second oriented map image from the server; and displaying the second oriented map image on a display of the client device.

3. The method of claim 2, wherein displaying the second oriented map image on a display of the client device includes:

displaying a list of available maps;

receiving a user selected available map of the list of available maps; and displaying the user selected available map as the oriented map image.

4. The method of claim 2, wherein the second oriented map image received from the server is in vector form and the oriented map image transmitted to the server is not in vector form.

5. The method of claim 1, wherein the image of the Earth is a satellite image of the area surrounding the geographic location.

6. The method of claim 1, wherein the image of the Earth is a street map of the area surrounding the geographic location.

7. A computer-implemented method comprising:

capturing an image of a map using a camera;

associating the image with a geographic location;

identifying, by a processor, an image of the Earth based on the geographic location;

displaying the image of the map and the image of the Earth on a display of a client device;

determining, by the processor, an orientation of the displayed image of the map with respect to the displayed image of the Earth based on information input into the client device by a user without requiring the user to visit multiple locations in the map image;

generating, by the processor, an oriented map image based on the orientation;

receiving information from a geographic positioning component of the client device;

subsequent to determining the orientation and receiving the information from the geographic positioning component, refining the orientation of the oriented map image based on both the orientation and the information received from the geographic positioning component without requiring the user to visit multiple locations in the map image;

transmitting the refined orientation to the server computer; and transmitting the oriented map image to a server.

8. The method of claim 4, wherein determining the orientation of the displayed image of the map includes overlaying the image of the map on the image of the Earth and the method further includes enabling rotation of the image of the map with respect to the image of the Earth until a desired orientation is reached, and wherein the information received by the client device includes the identity of the desired orientation.

9. The method of claim 8, wherein the rotation is configured to be performed by rotating the client device while maintaining the location of either the image of the map or the image of the Earth with respect to the display of the client device based on information received from an orientation apparatus of the client device.

10. The method of claim 8, wherein the rotation is configured to be performed by dragging a point on the map image using a touch screen of the client device.

11. The method of claim 7, wherein identifying the image of the Earth based on the geographic location includes:

transmitting a request to the server for an image of the Earth, the request including the geographic location; and receiving the image of the Earth from the server.

12. The method of claim 7, wherein identifying the image of the Earth based on the geographic location includes retrieving the image of the Earth from local memory of the client device based on the geographic location.

13. The method of claim 7, further comprising:

transmitting a request for a map image to the server computer, the request including a geographic location;

receiving a second oriented map image from the server; and displaying the second oriented map image on a display of the client device.

14. The method of claim 13, wherein displaying the second oriented map image on a display of the client device includes:

displaying a list of available maps;

receiving a user selected available map of the list of available maps; and displaying the user selected available map as the second oriented map image.

15. The method of claim 13, wherein the second oriented map image received from the server is in vector form and the oriented map image transmitted to the server is not in vector form.

16. A computer-implemented method comprising:

capturing an image of a map using a camera;

associating the image with a geographic location;

identifying, by a processor, an image of the Earth based on the geographic location;

displaying the image of the map and the image of the Earth on a display of a client device;

determining, by the processor, an orientation of the displayed image of the map with respect to the displayed image of the Earth based on information input into the client device by a user without requiring the user of the client device to visit multiple locations in the map image;

generating, by the processor, an oriented map image based on the orientation;

transmitting the oriented map image to a server, wherein the oriented map image is contributed by the user of the client device;

transmitting a request for information to the server identifying the user of the client device; and receiving, in response to the request, statistics regarding a number of users which have viewed a processed version of the oriented map image contributed by the user of the client device.

17. The method of claim 16, further comprising receiving annotation information regarding the oriented map image.

18. The method of claim 16, further comprising:

generating orientation information based on information received from a geographic positioning component of the client device;

refining the orientation of the oriented map image based on both the orientation and the information received from the geographic positioning component; and transmitting the refined orientation to the server computer.

19. The method of claim 16, further comprising:

transmitting a request for a map image to the server computer, the request including a geographic location;

receiving a second oriented map image from the server;

displaying the second oriented map image on a display of the client device; and wherein the second oriented map image received from the server is in vector form and the oriented map image transmitted to the server is not in vector form.

20. The method of claim 16, wherein orienting the image of the map includes:

displaying the image of the map proximate to the image of the Earth on the display;

the information input into the client device by the user includes the selection of a first set of corresponding locations between the image of the map and the image of the Earth and the selection of a first set of corresponding locations between the image of the map and the image of the Earth; and transmitting the first set of corresponding locations and the second set of corresponding locations to the server.

* * * * *

UNITED STATES PATENT AND TRADEMARK OFFICE
CERTIFICATE OF CORRECTION

PATENT NO. : 8,164,599 B1
APPLICATION NO. : 13/150478
DATED : April 24, 2012
INVENTOR(S) : Kadous et al.

Page 1 of 1

It is certified that error appears in the above-identified patent and that said Letters Patent is hereby corrected as shown below:

In the Claims:

Column 14, line 13, "claim 4," should read --claim 7,--.

Signed and Sealed this
Twenty-seventh Day of August, 2013

Teresa Stanek Rea
*Acting Director of the United States Patent and Trademark Office*

UNITED STATES PATENT AND TRADEMARK OFFICE
CERTIFICATE OF CORRECTION

PATENT NO.        : 8,164,599 B1                                      Page 1 of 1
APPLICATION NO.   : 13/150478
DATED             : April 24, 2012
INVENTOR(S)       : Mohammed Waleed Kadous and Russell Heywood It is certified that error appears in the above-identified patent and that said Letters Patent is hereby corrected as shown below:

In the Specification

Column 13, Line 32, delete the word "computer".

Column 14, Line 10, delete the word "computer".

Column 14, Line 12, delete the word "a" and insert the word --the--.

Column 14, Line 41, delete the word "computer".

Column 16, Line 1, delete the word "computer".

Column 16, Line 3, delete the word "computer".

Signed and Sealed this
Twenty-eighth Day of March, 2017

Michelle K. Lee
*Director of the United States Patent and Trademark Office*